United States Patent [19]
Abrams et al.

[11] Patent Number: 4,804,523
[45] Date of Patent: Feb. 14, 1989

[54] USE OF SEAWATER IN FLUE GAS DESULFURIZATION

[75] Inventors: Jack Z. Abrams, San Rafael; August D. Benz, Hillsborough, both of Calif.; Leon Awerbuch, Chevy Chase, Md.; Stanley J. Zaczek, San Francisco, Calif.; John Haidinger, Taipei, Taiwan

[73] Assignee: Bechtel Group, Incorporated, San Francisco, Calif.

[21] Appl. No.: 65,035

[22] Filed: Jun. 17, 1987

[51] Int. Cl.$^4$ .............................. C01B 17/00
[52] U.S. Cl. .................................. 423/242
[58] Field of Search ............. 423/242 A, 242 R

[56] References Cited

U.S. PATENT DOCUMENTS

| | | |
|---|---|---|
| 3,622,270 | 11/1971 | Shah et al. ................. 23/129 |
| 3,650,692 | 3/1921 | Villiers-Fisher ............ 23/178 |
| 3,653,823 | 4/1977 | Shah ........................... 23/129 |
| 3,904,742 | 9/1975 | Akimoto ..................... 423/554 |
| 4,046,856 | 9/1977 | Itoo et al. ................... 423/166 |
| 4,085,194 | 4/1978 | Otani et al. ................. 423/242 |
| 4,246,245 | 1/1981 | Abrams et al. ............. 423/242 |
| 4,337,230 | 6/1982 | Ellestad et al. ............ 423/242 |
| 4,623,523 | 11/1986 | Abrams et al. ............. 423/242 |

FOREIGN PATENT DOCUMENTS

| | | |
|---|---|---|
| 2755252 | 7/1979 | Fed. Rep. of Germany ... 423/242 A |
| 9052168 | 5/1974 | Japan ........................... 423/242 A |
| 9061085 | 6/1974 | Japan ........................... 423/242 A |
| 49-52762 | 9/1974 | Japan . |
| 9117393 | 11/1974 | Japan ........................... 423/242 A |
| 7043182 | 10/1977 | Japan ........................... 423/242 A |
| 0068121 | 4/1982 | Japan ........................... 423/242 A |
| 57-39167 | 8/1982 | Japan . |

Primary Examiner—John Doll
Assistant Examiner—Lori S. Freeman
Attorney, Agent, or Firm—Townsend & Townsend

[57] ABSTRACT

Efficient removal of sulfur dioxide from a flue gas stream is achieved in a scrubber using a recirculating aqueous stream containing magnesium hydroxide and magnesium sulfite which together act as $SO_2$ absorbents. Magnesium sulfite is derived from magnesium hydroxide, which is the product of a reaction between soluble magnesium from the seawater and calcium hydroxide added to the scrubbing system. Magnesium sulfite and bisulfite are oxidized to magnesium sulfate by the introduction of air. Magnesium sulfate is converted back to magnesium hydroxide by reaction with additional calcium hydroxide, with gypsum as a by-product. Gypsum is soluble in large amounts of seawater and may be returned to the ocean without adverse environmental impact.

16 Claims, 2 Drawing Sheets

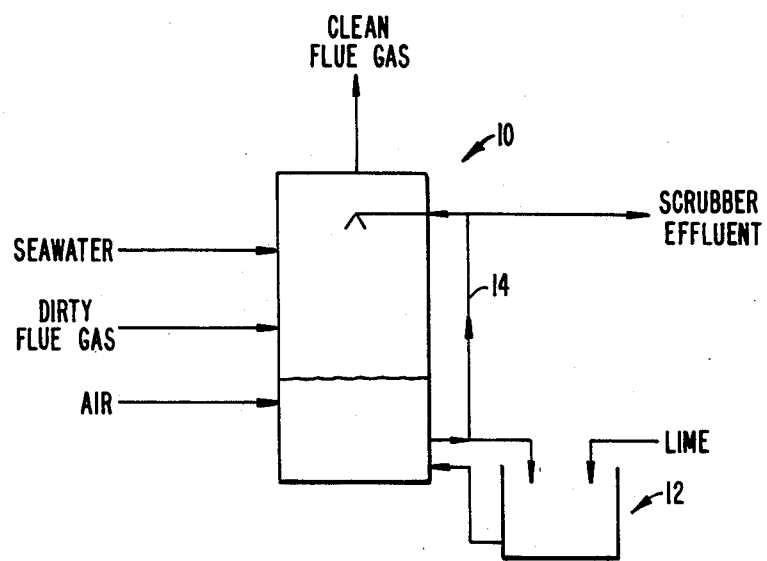
FIG._1.

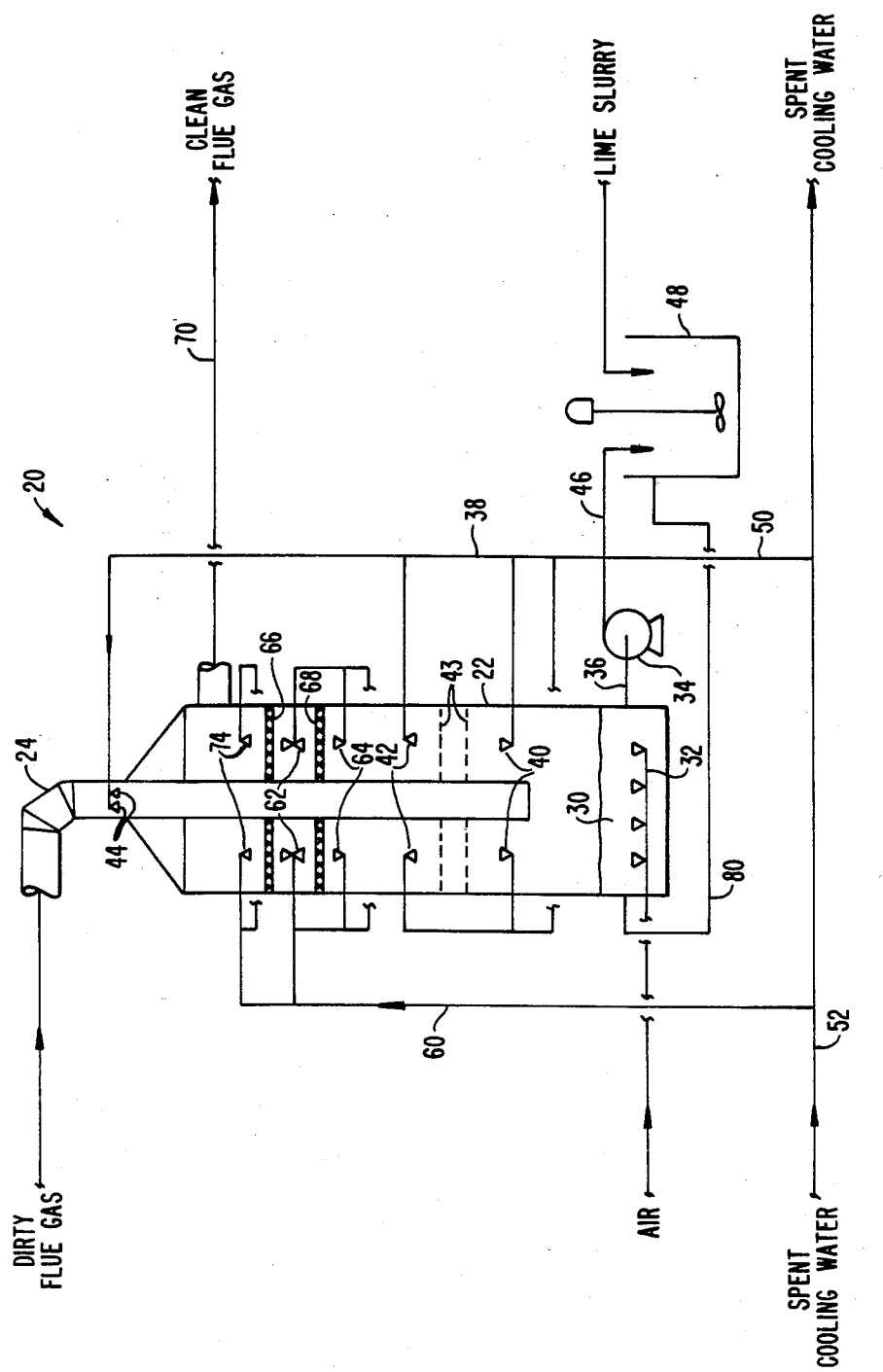
FIG._2.

USE OF SEAWATER IN FLUE GAS DESULFURIZATION

BACKGROUND OF THE INVENTION

1. Field of the Invention

The present invention relates generally to the removal of sulfur dioxide from effluent gas streams. More particularly, the invention relates to the removal of sulfur dioxide ($SO_2$) from flue gas streams by the use in a scrubber of a recirculating aqueous stream containing magnesium sulfite as a strong sulfur dioxide absorbent. The magnesium sulfite is derived from magnesium hydroxide, which in turn is derived from the reaction of soluble magnesium in seawater with calcium hydroxide.

Sulfur is found in a wide variety of fossil fuels in greater and lesser amounts. When burning the fuels, oxidation of the sulfur results in formation of sulfur dioxide, which is a serious pollutant. The sulfur dioxide forms sulfurous acid when mixed with water and, upon oxidation, will form sulfuric acid. Together, these acids are believed to be a primary cause of "acid rains" which have been responsible for injuries to the environment. It would therefore be desirable to provide methods and apparatus for preventing or inhibiting the release of sulfur dioxide into the atmosphere when burning sulfur-containing fossil fuels.

Three primary approaches have been proposed for the control of the sulfur dioxide emissions. The first approach relies on the removal of sulfur from the fuel prior to combustion. The second approach relies on the removal of sulfur dioxide during combustion, typically by injection of alkali into the combustion chamber of a furnace. The third approach relies on the removal of sulfur dioxide from the combustion gases after burning of the fuel. The present invention relates to the latter approach, and in particular relates to the reaction of magnesium from seawater with hydrated lime to form magnesium hydroxide which is used to chemically absorb sulfur dioxide from the combustion effluent gases.

The use of seawater for flue gas desulfurization has been previously proposed. In most cases, the natural alkalinity of seawater is relied on to desulfurize the combustion effluent in a single-pass system. Although effective, the use of seawater alone requires a very large flow to remove a high percentage of the sulfur dioxide. For power plants which utilize spent cooling water from the turbine condensers as the seawater source, it would be necessary to employ from 20% to 100% of the total cooling water flow in order to remove a high percentage of sulfur dioxide. The equipment and operating costs for handling such large volumes of water can be prohibitively expensive. Moreover, the seawater used to absorb sulfur dioxide will also absorb large amounts of heat, which results in a temperature rise which can be detrimental to the marine environment. Neutralization and oxidation of the scrubber effluent will require additional treatment capability, further increasing the capital and operating costs of the process.

It would thus be desirable to provide methods and systems which employ seawater to efficiently scrub sulfur dioxide-containing gases. In particular, such methods and systems should be able to function with relatively low volumes of seawater; e.g., less than 2%, preferably less than 1%, of the spent cooling water flow from the turbine condensers of a power plant in order to treat the entire effluent gas flow. It would further be desirable if the aqueous effluent from such a treatment process could be returned to the marine environment without further treatment, and that the process would not require the separation of solid wastes at any point. Finally, it would be highly desirable if the process resulted in only a very limited temperature rise in the seawater being returned to the marine environment, preferably less than 1 degree C, more preferably less than 0.5 degree C.

2. Description of the Background Art

U.S. Pat. No. 4,085,194 describes the use of a large flow of seawater (spent cooling water) to remove sulfur dioxide ($SO_2$) from flue gases. As the natural alkalinity of the seawater is relied on for such removal, it would be necessary to use most or all of the spent cooling water flow from the turbine condensers to effect a high percentage of desulfurization in a power plant burning coal having a sulfur content of from about 1.0% by weight or higher. The $SO_2$-containing seawater must then contacted with an oxygen-containing gas for removing carbon dioxide in order to increase the pH and oxidize sulfite ions to sulfate ions prior to return of the seawater to the marine environment.

U.S. Pat. No. 4,337,230 describes the addition of calcium oxides to seawater subsequent to sulfur dioxide absorption. Approximately 20% of the cooling water from the turbine condensers of a power plant would be required for high percentage desulfurization on a once-through basis. Even when recombined with the remaining 80% of the cooling water, a significant temperature increase occurs which could affect the marine biology. Moreover, the capital and operating costs of the system are very high, and sulfur dioxide will be released as a result of oxidation of the very low pH seawater effluent. Finally, full oxidation of the seawater effluent is difficult to achieve, leaving significant chemical oxygen demand which could be harmful to the ocean environment.

Litter, "Flue Gas Washing at Power Stations in the U.K. 1933–1977," July 1976, discussed in U.S. Pat. No. 4,337,230, describes the use of spent cooling water to scrub sulfur dioxide from a power plant flue gas on a once-through basis. Approximately 10% of the total cooling water flow is required, and limestone (calcium carbonate) is added to the cooling water to increase its absorptive capacity. After scrubbing, the absorbed sulfites are oxidized to sulfates by aeration in the presence of a manganese sulfate catalyst, and the aerated water is recombined with the remaining 80% of the cooling water prior to discharge. The method requires that the calcium sulfite and calcium sulfate reaction products, and excess calcium carbonate, be separated by filtration prior to discharge. Moreover, the final effluent has a pH of about 2.3, allowing substantial release of sulfur dioxide from the water. Finally, the effluent will have substantial chemical oxygen demand because of the difficulty of providing complete oxidation at low pH.

Japanese Pat. No. 49-52762 describes the addition of milk of lime to seawater, used as a cooling water stream, to obtain magnesium-free seawater and a magnesium hydroxide slurry. The magnesium hydroxide slurry is used to treat a sulfur dioxide-containing waste gas, resulting in a magnesium sulfite-containing slurry. The magnesium sulfite solution is separated from the magnesium hydroxide slurry, oxidized to magnesium sulfate, and combined with the magnesium-free seawater. The slurry is recycled. Although this approach is theoretically possible, separation of very fine particles of magnesium hydroxide from the slurry is very difficult to achieve in practice.

U.S. Pat. No. 4,246,245 describes the use of Type S hydrated lime as an absorbent for sulfur dioxide in a wet scrubber, spray dryer, or boiler injections system. Type S hydrated lime includes both calcium and magnesium hydroxides, where the magnesium hydroxide is converted to magnesium sulfite in the presence of the sulfur dioxide.

See also U.S. Pat. Nos. 3,622,270; 3,650,692; 3,653,823; 3,904,742; 4,046,856; and 4,623,523; and Japanese Pat. Nos. 49-110570; 55-73326; and 80-25892 which relate to flue gas desulfurization.

SUMMARY OF THE INVENTION

The present invention provides for substantially complete removal of sulfur dioxide ($SO_2$) from $SO_2$-containing effluent gases, particularly from $SO_2$-containing flue gas streams of fossil fuel power plants. An absorbent is formed by combining seawater and hydrated lime usually at a pH in the range from 8.0 to 10.0, producing magnesium hydroxide by the reaction of the hydrated lime with soluble magnesium which is naturally present in the seawater as chloride and sulfate. The absorbent is then added to a recirculating absorbent stream, typically at a more acid pH, usually below about 6.0, and the absorbent stream is contacted with the flue gas in a suitable contact vessel. In the contact vessel, the magnesium hydroxide reacts with the $SO_2$ in the flue gas to form magnesium sulfite and bisulfite. The magnesium sulfite and bisulfite, in turn, are oxidized, to soluble magnesium sulfate, typically by air sparging in the contact vessel or a separate tank. Magnesium sulfate reacts with the added hydrated lime to regenerate magnesium hydroxide and produce gypsum. These reaction products are recirculated as a slurry in the scrubber for the removal of $SO_2$ and sulfurous acid without the requirement of separating magnesium hydroxide from the rest of the slurry stream. The gypsum is non-toxic and may safely be returned to the marine environment in soluble form at very low concentrations.

In the specific embodiment, the seawater is obtained from the spent cooling seawater from the turbine condensers of the power plant. Only a small portion of the cooling seawater (typically less than 2%, and usually below 1%) is required. This diverted seawater is combined as a make-up stream with the recirculating absorbent, providing additional soluble magnesium (which is naturally present in the seawater). Hydrated lime is also continuously introduced to a portion of the recirculating stream, and the lime and magnesium chloride and sulfate react to replace the magnesium hydroxide which is consumed by reaction with $SO_2$. Mass balance of the system is maintained by bleeding a small effluent stream from the recirculating stream. The effluent stream, which contains a few weight percent gypsum, may be combined with the primary spent cooling seawater stream prior to release to the marine environment. Dilution of the effluent stream in the primary cooling water stream both assures the dissolution of the gypsum and minimizes the temperature effect on the marine environment. Typically, the temperature rise will be less than 1° C. usually being less than 0.5° C.

In comparing the process of the present invention with other $SO_2$-removal process, a number of advantages will become apparent. The present invention results in no consumption of magnesium. The magnesium provided by the seawater is eventually returned to the sea in an aqueous scrubber effluent stream. Substantially complete lime utilization and solubility of gypsum in a cooling water return stream allow a clear discharge stream to the ocean or other cooling water source.

Magnesium hydroxide and magnesium sulfate react very fast with sulfurous acid, producing magnesium sulfite and bisulfite. For this reason the recirculation rate of the absorbent slurry through the scrubber can be reduced to about one-quarter of that required by a regular lime/limestone scrubber. A lower recirculation rate allows a reduction in the number of pumps, pipes, distribution headers, spray nozzles, etc., and therefore lower capital and operating cost.

The present invention is able to completely oxidize all sulfite to sulfate to make possible the return of the scrubber effluent to the sea. That is, by scrubbing with magnesium hydroxide, the magnesium sulfite and bisulfite are soluble and can easily be oxidized with only moderate contact with air at a pH of 5 to 6. In contrast, by scrubbing with seawater alone (without the addition of alkali in the scrubber), the scrubber effluent is very acidic (pH of 2.5 to 3.5) which makes full oxidation of the sulfites to sulfate extremely difficult, and which may also allow the release of $SO_2$ from the effluent during a subsequent oxidation operation outside the scrubber. In further contrast, scrubbing with lime/limestone produces soluble calcium bisulfite only at a low pH of 3 to 4. To oxidize the lime/limestone scrubber effluent to calcium sulfate requires a larger amount of air and a longer residence time than is required by the present invention. Therefore, larger equipment and higher operating costs result.

As a final advantage, the present invention produces substantially no undissolved solids in the aqueous effluent. Very fine crystals of gypsum (calcium sulfate) formed in the reaction between magnesium sulfate and calcium hydroxide will dissolve almost instantaneously into a dilution stream. No tanks or mixers are required for solubilization. In contrast, with lime/limestone scrubbing, the calcium bisulfite oxidizes slowly, creating larger gypsum crystals, which require a longer period of time to be solubilized. Additional tanks and mixers would be required to dissolve such large crystals.

BRIEF DESCRIPTION OF THE DRAWINGS

FIG. 1 is a block diagram illustrating the primary process flow lines of the present invention.

FIG. 2 is a more detailed flow chart illustrating an apparatus suitable for practicing the method of the present invention.

DESCRIPTION OF THE SPECIFIC EMBODIMENTS

The present invention includes methods and apparatus for the desulfurization of flue gases from various fossil fuel burning installations, typically power plants and other facilities located along the coast and having a supply of seawater available in the form of spent cooling water from turbine condensers or other heat exchange services. Depending on the sulfur content of the fuel, the flue gases in such plants may have a sulfur dioxide content in the range from about 500 to 4000 ppm, more usually about 1000 to 1500 ppm. Although the present invention will be useful with power plants burning virtually any type of sulfur-containing fuel, it is particularly useful with coal burning power plants. The burning of some high sulfur residual fuel oils results in a flue gas having objectionable levels of organic materials and heavy metals, which may require treatment in addition to that which is described.

Desulfurization is accomplished by contacting the flue gas with a recirculating absorbent stream in a suitable contact vessel, typically a scrubber. The absorbent in the recirculation stream includes magnesium hydroxide ($Mg(OH)_2$) as a chemical absorbent species which reacts rapidly with sulfur dioxide to produce magnesium sulfite ($MgSO_3$) and magnesium bisulfite ($Mg(HSO_3)_2$). The magnesium sulfite and bisulfite are oxidized to magnesium sulfate and then converted to magnesium hydroxide by reaction with calcium hydroxide, resulting in gypsum ($CaSO_4 \cdot 2H_2O$) as a final product (along with calcium chloride ($CaCl_2$) and magnesium sulfate ($MgSO_4$), as described in more detail hereinbelow). The gypsum, which has a low solubility in water, is removed in a bleed stream from the system and then combined with sufficient excess of seawater so that it is easily solubilized and no solid wastes are produced. Equally important, the gypsum (in low concentration in seawater) and the soluble calcium and magnesium are non-toxic to the marine environment, and the system as a whole produces a minimal temperature rise in the waters which are returned to the ocean. Conveniently, bleed stream from the system can be dissolved in the remaining flow of spent cooling seawater and returned to the ocean with no adverse impact on the environment.

Seawater is used as the source of magnesium (in the form of magnesium chloride ($MgCl_2$) and magnesium sulfate ($MgSO_4$) to produce the magnesium hydroxide absorbent by reaction with hydrated lime ($Ca(OH)_2$). The reaction will usually take place within a separate slurry tank where the reaction may be completed prior to introduction of magnesium hydroxide into the recirculating absorbent stream. The reaction in the slurry tank is carried out at a pH in the range from about 8.0 to 10.0, more usually in the range from about 8.5 to 9.5, in order to assure sufficient production of the $Mg(OH)_2$ and substantially complete utilization of the lime. A particular advantage of the present invention lies in the efficient utilization of lime which not only reduces operating costs, but also prevents the environmentally objectionable release of lime in the aqueous effluent stream of the scrubber.

Another advantage is found in the reduced amount of seawater required to carry out the process. Only enough seawater is required to replace the combined volumes of the bleed stream and the seawater evaporated in the scrubber. In this way, usage of seawater in the scrubber can be reduced to less than 2%, and usually less than 1% of the volume of spent cooling seawater from the turbine condensers of a typical power plant.

Referring now to FIG. 1, the process of the present invention will be described in general. A contact vessel 10 and a slurry tank 12 are connected to each other and with various inlet and outlet streams, as illustrated. Dirty flue gas enters the side of contact vessel 10 and exits as clean flue gas, with at least about 90 volume % of the sulfur dioxide removed, usually with about 98 volume % sulfur dioxide removal. Seawater is added as a source of magnesium and make-up water. Air is introduced in order to oxidize the magnesium sulfite which is produced from the reaction of the magnesium hydroxide and sulfur dioxide.

An absorbent stream is continuously recirculated from the bottom of contact vessel 10 through line 14 to the top of the vessel. A portion of the recirculating stream is diverted to the slurry tank 12, and a second portion is bled from the system as scrubber effluent. Hydrated lime is added to the absorbent in the slurry tank 12, and the slurry reintroduced to the contact vessel 10 at its bottom.

The pH of the recirculating absorbent will be maintained in the range from about 4.5 to 6.0, more usually in the range from about 5.5 to 6.0. Operation within these limits assures that magnesium hydroxide will be completely reacted within the scrubber and not accidentally released to the ocean in its solid form.

The reaction chemistry characteristic of the chemical absorption of sulfur dioxide is set forth in equations (1) through (8) below. The reactions of equations (1) and (7) occur primarily in the slurry tank 12, while the reactions of equations (2) through (6) occur in the contact vessel 10. As can be seen from the overall reaction equation (8), gypsum is the sole non-naturally occurring by-product of the $SO_2$ absorption present in any significant amount. Soluble calcium and magnesium occur naturally in seawater and cause no adverse environment effects. The gypsum has a solubility of about 0.3% by weight and will normally be dissolved in a dilution stream of seawater in order to assure dissolution prior to discharge to the ocean. With power plants, dilution can be achieved with the large flow of spent cooling seawater from the turbine condensers. Of course, the dilution stream need only be large enough to assure dissolution, typically being about 10 to 30 times the flow of the bleed stream, depending on the concentration of the gypsum. An advantage of the present invention lies in the production of very fine particles of gypsum. Such particles are readily dissolved after mixing with the dilution stream, requiring no retention time prior to release to the ocean.

Reaction Chemistry $$MgCl_2 + Ca(OH)_{2(s)} = Mg(OH)_{2(s)} + CaCl_2 \quad (1)$$

Magnesium from Seawater (Soluble) + Lime Added in Regeneration Tank = Magnesium Hydroxide + Calcium Chloride (Soluble)

$$SO_2 + H_2O = H_2SO_3 \quad (2)$$

Sulfur Dioxide from Flue Gas + Water = Sulfurous Acid $$Mg(OH)_{2(s)} + H_2SO_3 = MgSO_3 + 2H_2O \quad (3)$$

Magnesium Hydroxide + Sulfurous Acid = Magnesium Sulfite (Soluble) + Water $$MgSO_3 + H_2SO_3 = Mg(HSO_3)_2 \quad (4)$$

Magnesium Sulfite (Soluble) + Sulfurous Acid = Magnesium Bisulfite (Soluble)

$$Mg(HSO_3)_2 + Mg(OH)_{2(s)} = 2MgSO_3 + 2H_2O \quad (5)$$

Magnesium Bisulfite + Magnesium Hydroxide = Magnesium Sulfite + Water

Reaction Chemistry -continued

| | | | | | |
|---|---|---|---|---|---|
| (Soluble) $MgSO_3$ Magnesium Sulfite | + | $\frac{1}{2} O_2$ Oxygen From Air | = | (Soluble) $MgSO_4$ Magnesium Sulfate | (6) |
| (Soluble) $MgSO_4$ Magnesium Sulfate | + | $Ca(OH)_2$ Lime Added To Slurry Tank | = | (Soluble) $Mg(OH)_2$ Magnesium Hydroxide(s) + $CaSO_4.2H_2O$ Calcium Sulfate(s) (Gypsum) | (7) |
| $MgCl_2 + SO_2 + 2Ca(OH)_2 + O_2$ | | | = | $CaSO_4 + 2H_2O + CaCl_2 + MgSO_4$ | (8) |

Seawater and lime are the primary materials consumed in performing the absorption of the present invention. Air is also utilized but is less critical because of its ready availability. The amounts of seawater and lime required will depend primarily on the concentration level of sulfur dioxide in the flue gas, which in turn will depend on the concentration of sulfur in the fuel and the amount of fuel burned. For a 500 megawatt (MW) power plant burning a coal which is 1.25% sulfur by weight, the seawater requirements for the scrubber will typically be in the range from about 1000 to 4000 gpm, more typically from about 900 to 1000 gpm. Lime (dry) requirements will be in the range from about 5000 to 8000 lb/hr, more typically from about 4500 to 5000 lb/hr (based on scrubbing 50% of the flue gas and 95% $SO_2$ removal in the scrubbed gas). The entire cooling water requirement for such a plant will typically be from about 170,000 to 200,000 gpm. Thus, the amount of cooling water which must be diverted for the scrubbers will typically be less than 2%, more typically being less than 0.5% of the amount required for the turbine condensers.

For convenience, the treatment of the entire flue gas stream or a partial stream from such plant may be divided among two or more separate contact vessels operating in parallel. The actual number of contact vessels utilized for any given application will depend on a normal economic optimization.

Referring now to FIG. 2, a system 20 for performing the method of the present invention is illustrated in greater detail. The system 20 includes a dual-flow tray tower 22 which acts as a scrubber for desulfurization of the incoming flue gas through a central duct 24. Other contactors having suitable gas-liquid contact means will also find use, including shed decks and packed columns. The flue gas will have been previously treated to remove fly ash and most other particulate contaminates. Usually, the scrubbing tower 22 will be rubber-lined to withstand the harsh chemical environment, or constructed of FRP (fiber glass reinforced plastic) or an appropriate corrosion resistant alloy.

A sump or heel 30 of the absorbent fluid is maintained at the bottom of the scrubber 22. A manifold 32 for air sparging is placed within the absorbent sump 30, and a recirculation pump 34 is connected to the sump through a suction line 36. The absorbent passing through pump 34 is primarily recirculated through line 38 and spray nozzles 40, 42, and 44. A side stream 46 from pump 34 is directed to slurry tank 48 while a second side stream 50 is discharged from the system. The discharge stream 50 is mixed with the primary flow of spent cooling water from the turbine condensers in order to dissolve the gypsum, as described above.

In some cases, it may be desirable to separate the sump 30 in a separate vessel (not illustrated). Such construction might, for example, facilitate provision for agitation within the sump 30. Provisions would have to be made of course, for transferring the absorbent between the tower 22 and the separate vessel.

A sidestream 60 from the spent cooling water line 52 is introduced into the scrubbing tower 22 through nozzles 62, 64, and 74. The nozzles 62 and 64 are placed between mist eliminators 66 and 68 which prevent carryover of the liquid into the cleaned flue gas stream 70 exiting the scrubber 22. In some cases, fresh water may be introduced through nozzles 74 above the upper mist eliminator 66 in order to reduce solid salt build-up resulting from the evaporation of seawater.

A lime slurry, typically being about 20 weight percent hydrated lime in fresh water, is admixed with the absorbent fluid in the slurry tank 48. After mixing, the reaction products are returned to the sump 30 through line 80.

In operation, the flue gas enters through central duct 24, and is discharged near the bottom of the scrubbing tower 22. The flue gas then flows upward through contact trays 43 generally in a counter current direction relative to the flow of absorbent downward through the tower. The flue gas continues to pass upward through the column and is eventually discharged through line 70. After discharge, the flue gas is normally exhausted through a conventional stack for dispersion and dilution in the atmosphere.

The recirculating absorbent stream will typically comprise about from 2% to 5% suspended solids by weight, typically being about 4% suspended solids, and 2% to 5% dissolved solids by weight, typically being about 3% to 4% dissolved solids, with a pH in the range from about 4.5 to 6.0 more usually being about 5.5 to 6.0. The liquid/gas (L/G) ratio for the system will typically be in the range from about 10 to 100 gal/1000 actual cubic feet (acf), more typically being about 25 to 60 gal/1000 acf. The amount of make-up cooling seawater 60 required is a small portion of the total volume of recirculating absorbent, typically being less than 10%, more typically being in the range from about 1% to 4%. The sidestream 46 which is mixed with the lime slurry in the slurry tank 48 will typically be from about 5% to 20% of the total volume of the recirculating absorbent stream, while the amount bled through line 50 will typically be in the range from about 1 to 10 volume percent.

The pH in the slurry tank 48 is controlled by adjusting the infeed of lime slurry. The pH of the absorbent circulating in vessel 22, in turn, is controlled by varying the volume of absorbent which is exchanged between the sump 30 and tank 48. It will be appreciated, of course, that the amount of lime added to the slurry depends ultimately on the amount of $SO_2$ absorbed from the flue gas.

An exemplary mass balance for the process of the present invention employed with a power plant having a total flue gas effluent of 1,411,750 lb/hr. with a sulfur dioxide content of about 1000 ppm is set forth below.

The balance assumes a recirculating absorbent stream of 8,766,450 lb/hr.

| MASS BALANCE | | | |
|---|---|---|---|
| IN | LB/HR | OUT | LB/HR |
| Dirty Flue Gas | 1,411,750 | Clean Flue Gas | 1,495,350 |
| Sea Water | 226,358 | Scrubber Effluent | 166,195 |
| Air | 9,137 | | |
| Lime Slurry | 14,300 | | |
| Total In | 1,661,545 | Total Out | 1,661,545 |

The following examples are offered by way of illustration, not by way of limitation.

EXPERIMENTAL

To demonstrate the effectiveness of the present invention in the treatment of an actual flue gas, the following experiment was performed. Flue gas samples were taken from a coal-burning power plant downstream of an electrostatic precipitator which had removed 99.4% by weight of the fly ash from the untreated flue gas. The flue gas samples had an $SO_2$ content of 950 ppm.

The flue gas was bubbled through a contactor containing an $SO_2$ absorbent prepared from seawater according to the present invention. The pH in the contactor was maintained in the range from about 5.5 to 6 by the addition of a magnesium hydroxide slurry prepared separately by the addition of a sufficient amount of calcium hydroxide to keep the pH of the slurry in the range from about 8 to 10. Compressed air was also bubbled through the contactor to oxidize the magnesium sulfite produced, as described above.

The gaseous effluent from the contactor had a sulfur dioxide content of about 20 ppm and a fly ash content of about 0.3% by weight of the untreated flue gas. Thus, $SO_2$ removal of approximate 98% was achieved, with a solubilization of approximately 0.3% by weight of the fly ash in the untreated flue gas. The removal of sulfur dioxide demonstrates the effectiveness of the present invention as a flue gas desulfurization process. The amount of fly ash removed, however, raises the possibility that the aqueous effluent from the treatment process might be toxic to marine life when released to the environment. Fly ash contains a significant proportion of soluble trace metals which would potentially be carried into the environment in the effluent bleed stream from the process. It was found, however, that the relatively high pH in the contactor did not result in the solubilization of a toxic amount of the metal oxides in the fly ash.

To confirm that the aqueous effluent from the treatment process was non-harmful to marine life, effluent prepared as just described was used in a mortality test on larvae and juvenile fish and shellfish. The fish and shellfish were exposed to effluent samples diluted with seawater to contain 150, 300, and 600 ppm soluble calcium suflate (gypsum). No adverse effect on the life cycle of the marine organisms was observed. The concentrations of soluble calcium sulfate tested represent from about 2 to 4 times the concentrations which would be expected from the normal practice of the present invention.

Although the foregoing invention has been described in some detail by way of illustration and example for purposes of clarity of understanding, it will be obvious that certain changes and modifications may be practiced within the scope of the appended claims.

What is claimed is:

1. A method for absorbing sulfur dioxide from a sulfur dioxide-containing gas, said method comprising:
    passing the sulfur dioxide-containing gas through a contact vessel;
    recirculating an aqueous absorbent through the contact vessel, said absorbent including magnesium hydroxide derived from the reaction of hydrated lime with soluble magnesium from seawater, whereby the net reaction of magnesium hydroxide and sulfur dioxide produces magnesium sulfite;
    oxidizing the magnesium sulfite without separation from the magnesium hydroxide to produce magnesium sulfate;
    reacting the magnesium sulfate in said recirculating absorbent with additional hydrated lime to produce gypsum and magnesium hydroxide;
    bleeding a portion of the recirculating absorbent to remove gypsum, whereby magnesium is also lost; and
    combining a sufficient amount of seawater with the recirculating abosrbent to balance the lost magnesium.

2. A method as in claim 1, wherein the aqueous absorbent is recirculated at an L/G rate in the range from about 10 to 100 gal/1000 acf.

3. A method as in claim 1, wherein the seawater is continuously combined with the recirculating absorbent.

4. A method as in claim 1, wherein the seawater is a portion of a spent cooling seawater stream from a power plant.

5. A method as in claim 1, wherein the hydrated lime is introduced to a portion of the absorbent in a slurry tank external to the contact vessel at a pH in the range from about 8.0 to 10.0.

6. A method as in claim 1, wherein the magnesium sulfite is oxidized by introducing air to a sump in the contact vessel.

7. A method as in claim 1, wherein the portion of the recirculating aqueous absorbent is bled into a dilution stream to dissolve the gypsum prior to discharge to the environment.

8. A method for absorbing sulfur dioxide in a flue gas, said method comprising:
    passing the flue gas stream through a contact vessel;
    recirculating an aqueous absorbent stream through said contact vessel at a pH in the range from about 4.5 to 6.0;
    diverting a portion of a seawater stream containing soluble magnesium to said vessel, whereby said portion is incorporated within the absorbent stream;
    mixing hydrated lime with a portion of the absorbent stream in a slurry tank at a pH of from about 8.0 to 10.0 to convert soluble magnesium derived from the seawater to magnesium hydroxide, whereby the net reaction of sulfur dioxide and flue gas and magnesium hydroxide in the absorber stream produces magnesium sulfite and whereby sufficient seawater has been diverted to balance the lost magnesium;
    oxidizing the magnesium sulfite without separation from the magnesium hydroxide to produce magnesium sulfate;

reacting the magnesium sulfate with additional lime to form gypsum and magnesium hydroxide; and bleeding a portion of the aqueous absorbent stream to continuously remove gypsum from said stream or slurry tank.

9. A method as in claim 8, wherein the weight ratio of the portion of the seawater stream to the recirculating abosrbent stream is in the range from about 0.01 to 0.10.

10. A method as in claim 8, wherein the portion of the absorbent stream which is mixed with hydrated lime is in the range from about 5 to 20 volume percent of the recirculating absorbent stream.

11. A method as in claim 8, wherein the absorbent stream is recirculated at an L/G ratio in the range from about 10 to 100 gal/1000 acf of the flue gas stream.

12. A method as in claim 8, wherein mixing of the hydrated lime with a portion of the absorbent stream includes:

diverting a portion of the recirculating absorbent stream to a separate slurry tank;

combining hydrated lime with the absorbent in the slurry tank;

agitating the combined hydrated lime and absorbent; and returning the reaction products including magnesium hydroxide to the contact vessel.

13. A method as in claim 8, wherein the magnesium sulfite is oxidized by introducing air to the contact vessel or to a separate vessel holding the absorbent.

14. A method as in claim 8, wherein the portion of the absorbent stream which is bled is combined with the remaining seawater stream, whereby the gypsum is dissolved in the seawater stream.

15. A method as in claim 8, wherein the pH of the mixing step is controlled by adjusting the amount of hydrated lime mixed.

16. A method as in claim 8, wherein the pH of the recirculating absorbent stream is controlled by adjusting the volume of the portion of the absorbent stream which is mixed with hydrated lime

* * * * *